Figure 1:
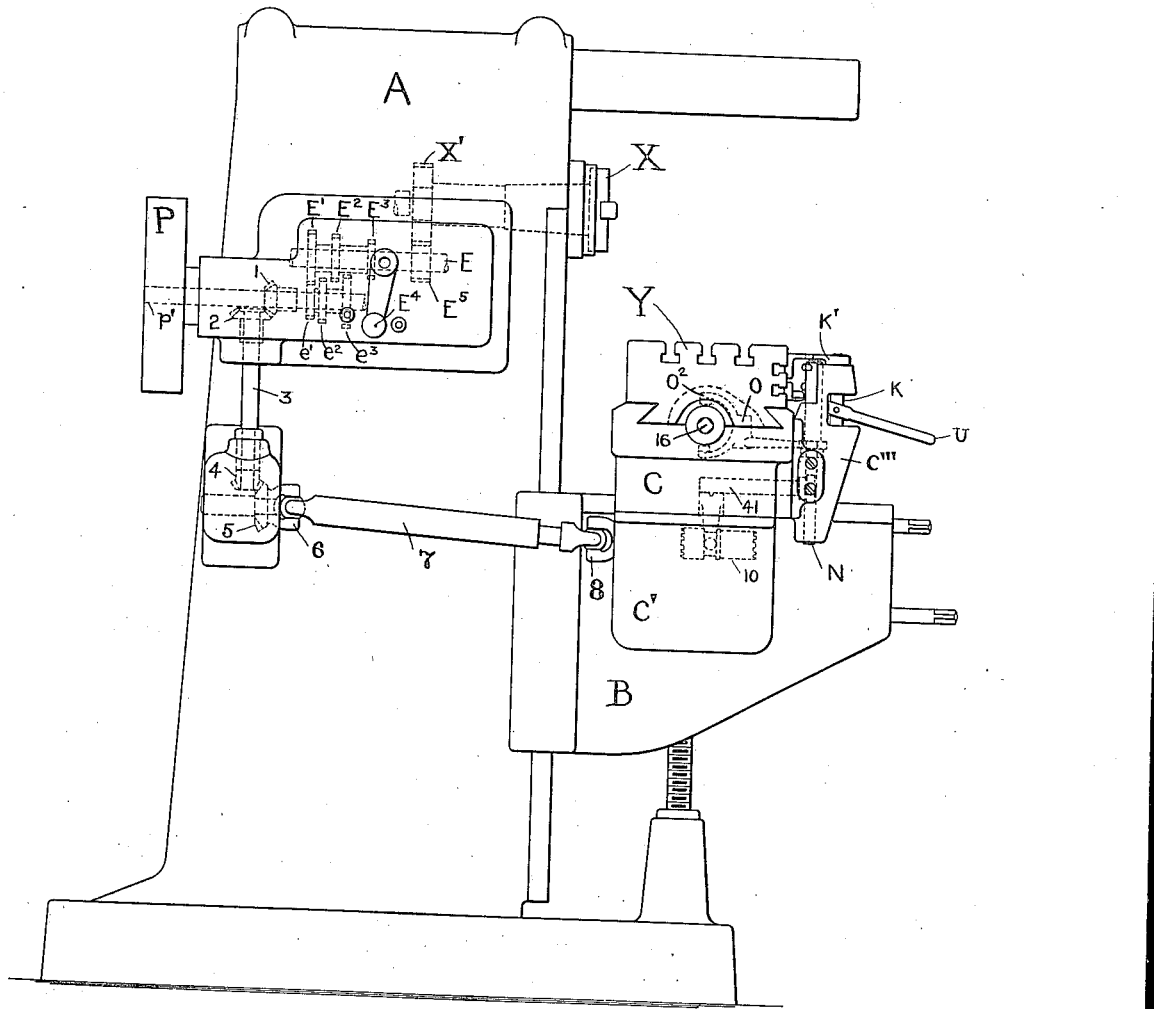

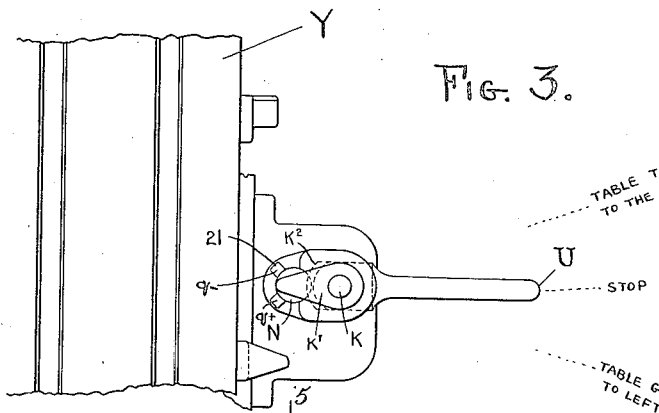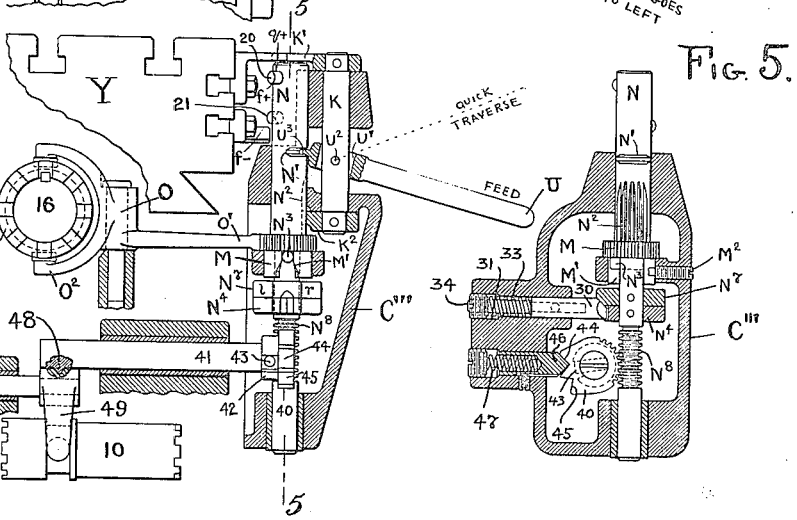

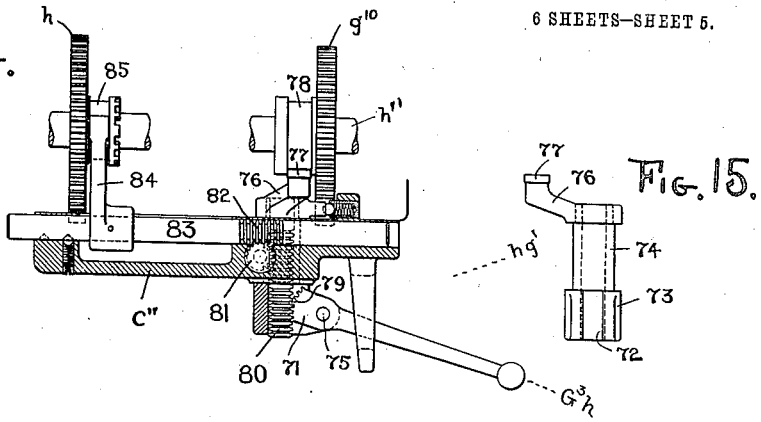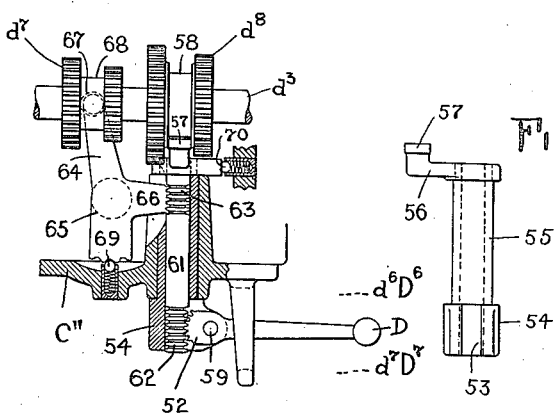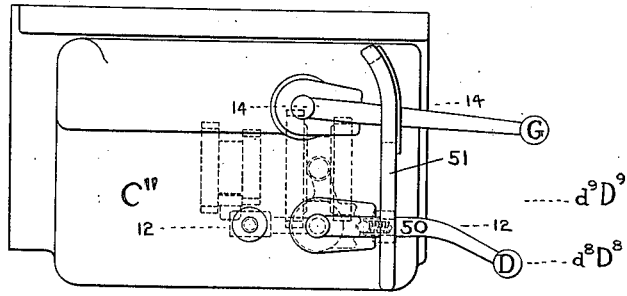

UNITED STATES PATENT OFFICE.

ROBERT T. HAZELTON AND SOL EINSTEIN, OF CINCINNATI, OHIO, ASSIGNORS TO THE CINCINNATI MILLING MACHINE CO., OF CINCINNATI, OHIO, A CORPORATION OF OHIO.

AUTOMATIC MACHINE-TOOL.

1,125,686.  Specification of Letters Patent.  Patented Jan. 19, 1915.

Application filed July 10, 1914. Serial No. 850,175.

*To all whom it may concern:*

Be it known that we, ROBERT T. HAZELTON and SOL EINSTEIN, citizens of the United States, and residing at Cincinnati, in the county of Hamilton and State of Ohio, have invented a new and Improved Automatic Machine-Tool, of which the following specification is a full disclosure.

This joint invention deals with machine tools and it undertakes to improve the mechanisms defined by the co-pending applications of Adolph L. De Leeuw, Serial No. 651,644, filed September 27th, 1911, and Serial No. 775,118, filed June 21st, 1913, and of Sol Einstein Serial No. 839,718 filed May 20th, 1914 and Serial No. 843,218, filed June 5th, 1914.

Among various other objects, this joint invention contemplates a table-propelling organization whereby the attendant may by merely manipulating a single lever or controller not only cause the table to execute a "quick-traverse" whenever desired, but whereby he may also cause it to "feed" at the predetermined tooling rate, or may either stop or reverse its direction of travel, or whereby these operations may be caused to take place automatically by dog-action under the control of the table.

Another object of the preferred species of this joint invention is to effect a rearrangement of conventional machines whereby the fast running "quick-traverse" elements, the slower running "feed" elements and the feed-change-mechanism, together with the coöperating shift devices for reversing the direction of motion as well as for bringing into action either the quick-traverse or the feed, will all be mounted directly on or otherwise supported by one or more of the mobile frame-units, *i. e.*, such as are mounted to permit of bodily movement in a vertical direction to vary the distance between the tool-carrying member and the table, as for instance the knee or saddle of a machine of the type illustrated.

Another object within the contemplation of this invention is to simplify the means instrumental in changing from a "quick-traverse" to a "feed," or vice versa, as well as for changing the direction of movement or for stopping the movement; and to provide a construction enabling the mechanism performing these offices to be compacted or brought to a sufficiently small compass to be located at the front longitudinal edge of the table under the immediate control of the attendant.

Another object is to coördinate the automatic features providing for intermittent-milling with a table-propelling mechanism embodying a non-translatable but rotatable screw so as to provide a convenient hand-feed for the table operative through a hand rotation of the feed screw while yet avoiding the necessity of journaling the screw on the table.

Another object is, while maintaining or extending its capacities, to effect a general simplification of a machine-tool by reducing the number of levers and the complexity of construction heretofore required for its practical operations; and not only to do this but to bring all the levers necessary for the various table movements immediately under the grasp of the attendant when located in the position most advantageously adapted for work inspection.

Another object is to create a control system affording a very adaptable dog-system which can easily be understood by an ordinary attendant and utilized to cause the table automatically to execute various tooling-cycles such as intermittent milling, continuous milling, or the like, to the end that the productivity of the machine will be materially increased.

Another object is to render available a control instrumentality for a machine-tool whereby the traveling tool or work-supporting element may be controlled automatically within very close limits and without introducing factors of uncertainty or inaccuracy.

A further and important object of this invention is to create a machine tool in which one of the working elements may be caused to travel either at a quick-traverse rate or at a feeding rate, and which is so constructed that a certain amount of slipping may take place when the movement is abruptly accelerated from the relatively slow feed rate to the much higher quick-traverse rate, so as to avoid any undue strain of the parts and whereby an inexpensive and easily replaceable element will be fractured in case undue strains arise during the existence of a positive feeding motion thereby preventing any possible injury to the immediate working elements of the machine.

Another object is to devise a trip arrangement for machine tools in which all of the dogs adjustably secured to the table will be of rigid construction and free from pivots or latch-like characteristics which tend to unreliability and uncertainty in the automatic operation of the machine.

A still further object is to create a trip system providing a first dog series for the advance travel and a second dog series for the retreat travel together with automatic means for bringing the trip means into operative relation with one or the other of said series.

Another object of this joint invention is to construct and arrange the dogs for the trip system in such a manner as to avoid swiveling or latch-like constructions thereby rendering the trip effect more positive and accurate, as well as enabling the dogs controlling the advance of the table to be positioned independently of the locations of the dogs governing its retreat and without creating any complication or interference due to any swiveling of the dogs; thereby enabling the slot for the upper series of dogs to lie very close to the slot for the lower series of dogs, thus making for compactness.

Another object is to create various improvements in the hand operated mechanism for executing or controlling a shifting of the gears of the feed-change mechanism.

Other objects will be in part obvious from the annexed drawings and in part indicated in connection therewith by the following analysis of this invention.

This invention accordingly consists in the features of construction, combinations of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 2:
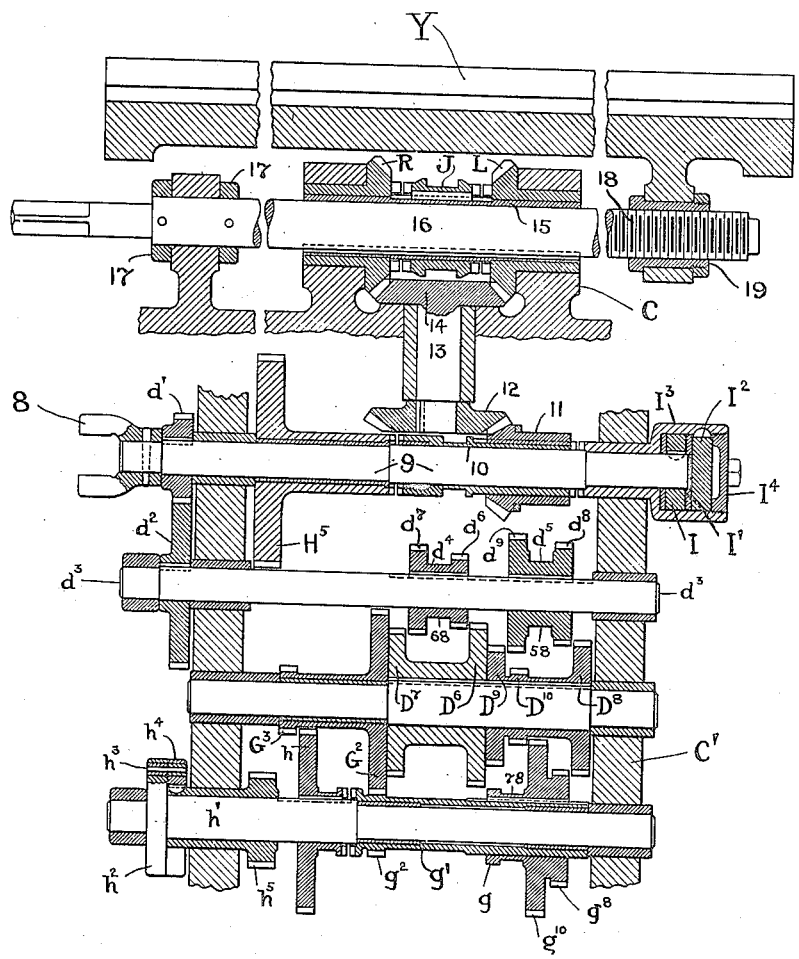
Figure 9:
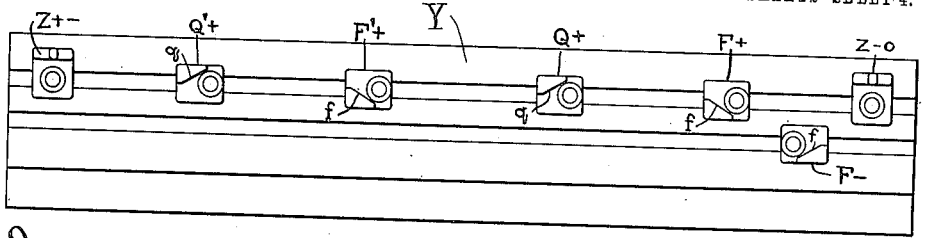
Figure 10:
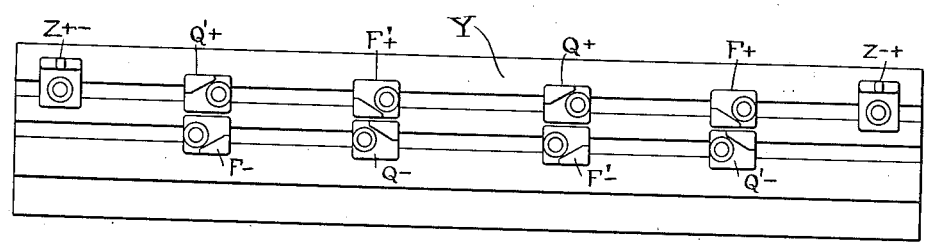
Figure 8:
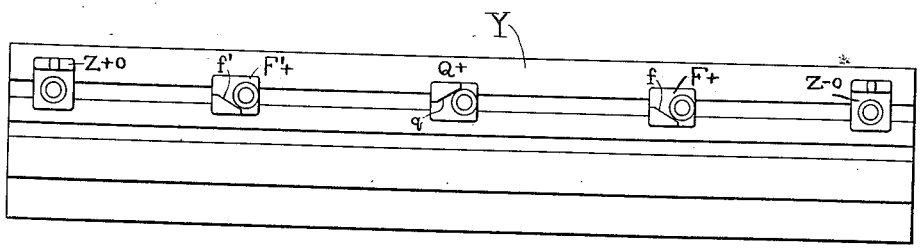
Figure 16:
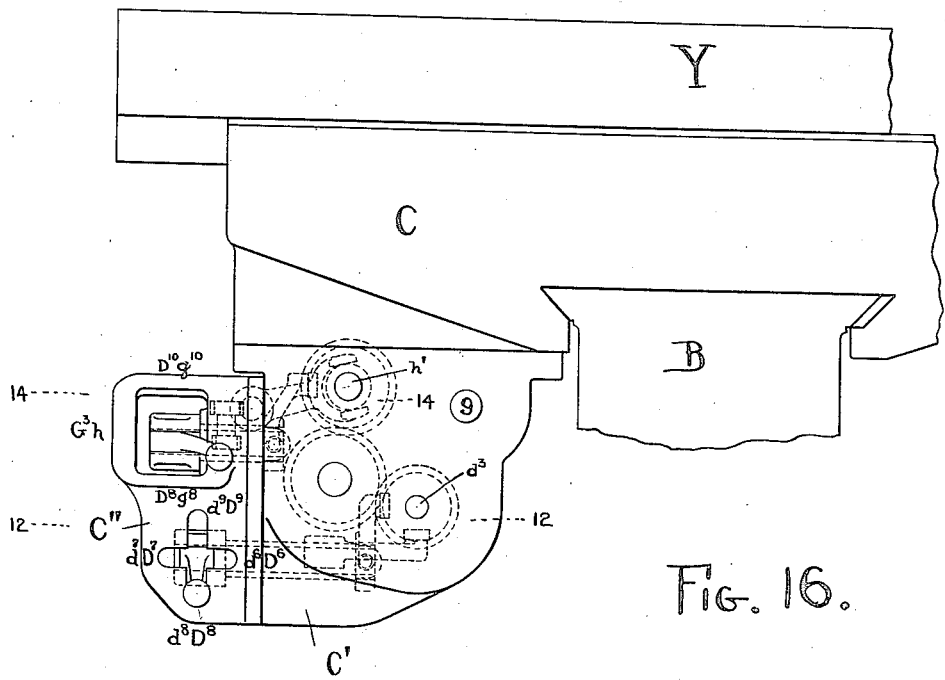

Figure 1 is a side elevation of a milling-machine of a knee-and-column type, exemplifying how any species of milling-machines may be reorganized to embody this joint invention. Fig. 2 is a diagrammatic drawing depicting a gear arrangement such as may be used for deriving a series of feeds as well as a quick-traverse and also for changing the direction of travel of the table; the various gears being brought into one plane to avoid the confusion incidental to an ordinary drawing. Fig. 3 is a fragmentary view looking down on a table and showing the nesting arrangement of the two dog-actuated parts of the trip-mechanism. Fig. 4 is a vertical elevation partly in section showing sundry details of the trip or control mechanism, whereby the table may be caused either to feed or make a quick-traverse and whereby its direction of movement may be reversed, or stopped. Fig. 5 is a section through line 5—5 of Fig. 4 showing further details of the trip mechanism. Fig. 6 is a plan of a detent feature utilized for maintaining the motion-reversing clutch either in its stop position or in its right or left-hand motion-transmitting position. Fig. 7 is a plan of an alternative detent-element which, when substituted in action, will prevent the clutch from remaining in its stopping position and will cause the table to travel either to the right or the left. Fig. 8 depicts a comparatively simple or rather elementary dog-arrangement in which the table is intended to be started by hand at a quick-traverse rate to the right and in which the dogs automatically alternate this quick-traverse with a feed during this single stroke and ultimately stop the advance of the table while it is feeding; thereby conditioning the table to be started by hand to make a complete return stroke either at a slow or feeding rate concluded by an automatic stop, or at a quick-traverse rate concluded by an automatic reversal at a quick-traverse rate according to the setting made by hand. Fig. 9 shows in elevation the front longitudinal edge of the table with an upper series of dogs producing a travel of the table to the right at alternate fast and slow rates terminating in a reversal of direction while maintaining a fast rate; and also showing a lower dog effective near the end of the stroke to the left to change the rate of travel to a "feed" to enable the dog at the extreme right to stop the travel. Fig. 10 shows another dog arrangement effective to maintain the table in a state of continuous reciprocation while at the same time causing its rate of travel during both the right-hand and the left-hand strokes to alternate between a "feed" and a quick-traverse. This motion may be termed continuous intermittent milling. Fig. 11 is a side elevation looking to the right of Fig. 10 showing one side of the gear-box and its operating levers. Fig. 12 is a plan partly in section through line 12—12 of Fig. 11 showing the mechanism for actuating two of the shiftable gear units. Fig. 13 is an elevation of one of the elements of the aforesaid mechanism. Fig. 14 is a plan partly in section through line 14—14 of Fig. 11 showing the construction for shifting two other gear units by means of the same hand lever. Fig. 15 is an elevation of one of the elements used in the last mentioned mechanism. Fig. 16 illustrates a front elevation of a portion of the knee, saddle and table of this machine showing the saddle supported gear-box together with the forwardly projecting hand levers for shifting the gears to produce the various changes in feed.

To obtain an adequate understanding of this invention, it should be kept in mind that the term "feed," as used herein, indicates any one of a series of relatively slow movements of the table all essentially suitable for tooling operations, and the term "feed-changer" or "feed-change mechanism" indicates only that particular device which determines the rate at which the table thus "feeds"; and it is to be distinguished from variable speed devices which effect changes not all identified with a tooling-operation, as well as from the "speed-change mechanism" herein referred to and which determines the speed of rotation of the cutter-spindle.

Before detailing the specific features of construction whereby these functions are attained it will be convenient first to describe certain major elements of a conventional milling machine. These comprise a table Y that supports the work and which is reciprocated to-and-fro to subject the work bolted thereon to the effect of the tool or cutter that is secured to an appropriate tool-supporting member here typified by a spindle X which, in this instance, is continuously rotated by power derived from the same source or prime-mover that actuates the table. In order to enable the machine properly to execute its functions, these actuated elements must be capable of being brought into adjustable relation with one another in two directions. This is accomplished by an interponent frame-unit B that intervenes between the frame-unit A that directly supports the spindle or tool-supporting member and the frame-unit C that directly mounts the table. In the type of machine illustrated, the interponent frame-unit B is commonly termed a "knee"; the table-supporting frame-unit C is usually termed a "saddle," and the spindle mounting frame-unit A is generally termed a "column." The chief mechanical characteristic of the interponent frame-unit B is that it provides for a relative vertical adjustment as to the spindle-mounting unit, and a horizontal adjustment as to the table-supporting unit, i. e., in a direction transverse to the other.

The spindle-mounting frame-unit, or "column" A, has heretofore been that also selected to rest on the floor and thus provide a foundation for the machine, as a whole, and it has also been utilized to support or mount both the change-gear mechanism that varies the speed of the spindle, as well as the change-gear mechanism that varies the rate of feed of the table. This, however, has resulted in a very considerable inconvenience to the attendant in manipulating the machine. That is to say, the attendant must be stationed at the outer longitudinal side of the reciprocating table in order to scrutinize the action of the machine, but, when so stationed, he is out of reach of the levers that effect all the changes of the rate of feed of the table, so that, in order to make these changes he must shift his position. This invention proposes, among other things, a rearrangement and a reconstruction of the control elements so as to free the so-called "column" of the machine from the mechanism that governs the rate at which the table shall feed, and so to locate the said mechanism, and so to combine it with other control features that the attendant, when stationed at the outer longitudinal edge of the reciprocating table (the edge remote from the frame-unit that uprises across the plane of the table) and without shifting his position, will be able, first, to change the rate at which the table feeds, i. e., to vary its speed during a cutting-stroke; second, to change the direction of travel of the table, either manually or automatically; and third, to stop the movement of the table either manually or automatically. In carrying out this aspect of this invention, one of the frame-units carrying the weight of the table may assume any conventional proportions or configuration, such as are indicated on the drawings, but with this distinction, that it is contrived also to support or carry the weight of what may be termed a "feed-change" box, i. e., the casing and elements constituting a change-gear mechanism such that the rate of "feed" may be varied at will. This box may also include other control features, such as the means for determining the direction of movement of the table.

A more comprehensive grasp of the various aspects of this invention may perhaps be obtained by tracing the course of motion through the machine in connection with a description of the structural features involved.

At a convenient point, as for example on a column A, is mounted a prime-mover P, here instanced as a pulley, and both the spindle and the table may be driven by this prime-mover. Thus, the shaft $p^1$, on which the pulley P is mounted, may (see Fig. 1) carry a number of gears $e^1$, $e^2$ and $e^3$ which are rotatable with the shaft. Each of these gears is rendered selectably available as a transmitting element by meshing it with the appropriate one of the gears $E^1$, $E^2$, $E^3$, (which are mounted as a unit on a sleeve splined to the shaft E) by shifting the gear unit through the hand-lever $E^4$. This causes gear $E^5$ to transmit motion at the rate determined by the intermeshing of the above mentioned gears. This motion is in turn communicated to the spindle X, as by means of a gear $X^1$ operatively connected thereto in an appropriate manner. In the embodiment under description, another transmission system derives motion directly from the prime-mover and includes the beveled gear 1 secured to the shaft $p^1$ and meshing with a beveled gear 2 which is located at the upper end of a shaft 3 which depends alongside of the frame-unit A or "column" and enters a box at the side of said frame-unit; within which it terminates in a bevel 4 that meshes with the bevel 5 secured to the horizontal knuckle 6. The foregoing embodiment constitutes a very simple structure for so locating the knuckle 6 that the deflection necessary for shaft 7 will be reduced to a minimum. The motion is then received by a knuckle 8 that is keyed to a shaft 9 which, in this embodiment, may be regarded as the initial terminal-member forming a junction from which branches both the quick-traverse transmission as well as the feed-change transmission, as will be explained. The ultimate or last terminal-member for these transmissions is a sleeve 10 loosely mounted on the shaft 9 and adapted to be shifted thereon so as to be connected on the one hand with the quick-traverse transmission, or on the other hand with the feed-change transmission as by means of appropriate clutch teeth at its respective ends. This sleeve 10 may be shifted or positioned by an automatic trip instrumentality, to be subsequently described, and, in splined relation with it, is a beveled gear 11 which is restrained against axial movement and meshes with a bevel 12 here shown as secured to a shaft 13, which in turn carries a beveled gear 14 at its upper end and which meshes both with the bevel R and the bevel L which are journaled in the table support C, here instanced as a "saddle." Passing through these bevel-gears R and L is a sleeve 15 which is normally in loose coaxial relation with these bevels, but which is splined to the shaft 16. In this embodiment, this shaft or feed-screw 16 is fixed against translation by means of the collars 17, and it is provided with screw-threads 18 meshing with a nut 19 that is non-rotatably mounted on the table Y so as to translate therewith. By this means, the table will be caused to travel at the rate determined by the rotation of the screw-shaft 16.

A motion-reverser is interposed in the transmission extending from 10 to 19 and it comprises a clutch-member J which is splined to the sleeve 15 and carries clutch-teeth at its ends whereby it may be engaged with corresponding teeth on the beveled gears R and L, so that, when the clutch member J is shifted to the one side, the table will be caused to travel to the right and, when it is shifted to the other side, the table will be caused to travel to the left. When this clutch-member is shifted on the sleeve 15 to an intermediate position, no motion at all will be transmitted, and hence the table will cease to travel. The means for automatically operating this motion-reverser will shortly be explained.

The quick-traverse transmission, which extends from the initial terminal element 9 to the ultimate terminal-member 10, is shown as of a very short and direct nature in this embodiment of this invention. Here, it merely comprises a disk I integral with or keyed, as shown, to the shaft 9. An element $I^1$ typifying a frictional or yielding part is pressed against the disk I, as by means of a part $I^2$ which is non-rotatably retained by the cup-like end of a sleeve $I^3$ which is in turn journaled in the wall of the box mounting the transmission system so as loosely to circumscribe the end of the shaft 9. By screwing up the follower $I^4$, any desired pressure may be brought to bear on the two sides of the intervening friction-element $I^1$ so that the sleeve $I^3$ will be frictionally driven at a rate corresponding to the shaft 9. These parts constitute a quick-traverse transmission having an impositive driving capacity, i. e., one embodying a friction-drive so that, when the quick-traverse transmission is thrown abruptly into action, a slight slip or yield will result in the drive to relieve the inertia and save the parts from the otherwise damaging strains of an unduly abrupt action. The sleeve 10, when shifted to the right as seen by Fig. 2, will become engaged with the sleeve $I^3$ by means of its clutch-teeth so that a driving-relation between these two parts will then exist with the result that motion will be imparted to the table at a quick-traverse rate. The motion appropriate for tooling operations is obtained by gearing down or reducing the motion of the shaft 9 through a suitable feed-change mechanism so as to obtain any desired rate of reduced travel corresponding with the tooling to be done.

The feed motion transmission, including the gearing enabling the rate of feed to be varied, will now be described. In this embodiment, this transmission also extends from the initial terminal-member 9 to the ultimate terminal-member 10, which in this instance is shiftable. Thus, a pinion $d^1$ is keyed to the shaft 9 and meshes with the gear $d^2$ which is keyed to the shaft $d^3$ so as to drive it. Splined to this shaft are two shiftable gear-units $d^4$ and $d^5$. The former carries the gears $d^6$ and $d^7$, and the latter carries the gears $d^8$ and $d^9$, and the purpose of enabling these gear bearers to be shifted is to utilize one or another of said four gears for propelling or transmitting purposes. Keyed to a shaft journaled in parallelism with shaft $d^3$ is a series of gears $D^6$, $D^7$, $D^8$, $D^9$ and $D^{10}$ which is so arranged that gear $d^6$ may be brought into mesh with gear $D^6$, and so on. In a suitable manner, motion is derived from one of these five gears. Thus, the gear-unit $g$ carries a gear $g^{10}$ which may be brought into mesh with gear $D^{10}$ by a lateral movement of the unit $g$, or similarly the gear $g^8$ may be meshed with gear $D^8$. Inasmuch as the unit $g$ is splined to a sleeve $g^1$, the latter will be rotated at a rate dependent upon the character of the foregoing intermeshing; with the effect that gear $g^2$, which is fast to the sleeve $g^1$, will directly drive the gear $G^2$ and indirectly the gear $G^3$ at a corresponding rate. The gear $G^3$ and the sleeve $g^1$ constitute terminal members, either of which may be brought into propelling relation with a gear $h$ which is splined to and therefore drives the shaft $h^1$. This connection is effected on the one hand by the teeth of the gear $G^3$, and on the other hand by the clutch-teeth at the end of the sleeve $g^1$. Fixed to the end of the shaft $h^1$ is a driving disk $h^2$ which carries a shear pin $h^3$ that projects into a corresponding recess in the companion disk $h^4$ and thereby drives the gear $h^5$. The purpose of this pin arrangement is to centralize all possibility of fracture on the pin $h^3$ so as to cause the breakage to occur in an easily replaceable element in case of any undue load. By this construction, a positive drive for all safe loads is insured during all tooling operations thereby enabling definite feeds and effects always to be secured, while yet avoiding any consequential damage to the machine in the event of excessive loads due either to accident or bad judgment on the part of the attendant. By combining this positive feed safety device with the above-described impositive quick-traverse safety means, the attendant becomes able safely to urge the machine to its utmost output from all standpoints. It should be noted that a primary characteristic of this combination is that it results in an effect unattainable by means of a single safety means of ordinary construction; that is to say, this combination affords a differential effect in that correct safety points are provided both for the relatively slow, but necessarily powerful "feed" of the table, as well as for the speedier and less resisted "quick-traverse" of the table. In accordance with this invention, the safety feed device will be so constructed as to transmit a predetermined stress such that the table will be "fed" against the resistance of safe tooling operations, and yet so as to yield or fail to transmit should an undue resistance accrue. For example, in this instance, the safety feed device will transmit the power necessary to feed the table against a resistance of from four to five tons pressure as a maximum. This will suffice for the tooling operations. The coöperating safety means, however, which exercises its office during the quick-traversing of the table is designed to yield under materially less stresses so that the table may be propelled against a resistance of only about one-fourth or one-fifth of that above-mentioned, say of one ton, since it is necessary for shock-absorbing purposes to use a comparatively free-acting yieldable friction means in handling the momentum or inertia of the parts. The gear $h^5$ in turn permanently meshes with gear $H^5$, which in this embodiment constitutes a terminal member of the "feed" transmission. That is to say, the gear $H^5$ has clutch teeth whereby it may be connected with the ultimate terminal-member 10, when it is properly shifted, and thereby cause the motion to be transmitted at the appropriate feeding rate, instead of at the quick-traverse rate. Inasmuch as the members $d^4$ and $d^5$ enable four feed-changes to be made, and the member $g$ introduces two other multipliers in serial relation with these changes, and the member $h$ also introduces two more multipliers in serial relation, it will therefore be evident that four times two times two, or sixteen different changes of feed are rendered available. The means whereby the above mentioned clutches or their shiftable elements may be moved both manually and automatically will now be detailed.

Referring to Fig. 4, U denotes a hand-lever that is adapted to oscillate in two directions, i. e., about a horizontal axis to determine the speed of travel of the table (up yielding a quick-traverse, and down giving a feed), and about a vertical axis to determine the direction of the travel, or to bring the table to a stop. This mechanism may best be understood by analyzing the construction in relation to each of the several elemental positions of this hand-lever U. Assuming the table to be stationary, then will the hand-lever U be located in a plane lying at right angles to the path of the table. In other words, the handle of the hand-lever U will be in the intermediate position shown by Figs. 3 and 4, and, when in this position, the clutch-member or motion-reverser J, will also be in the intermediate or zero position, as illustrated by Fig. 2. This follows because of the construction and relation of the parts intervening between the hand-lever U and the clutch J, and will now be described.

The hand-lever has an opening $U^1$ near one end through which projects a shaft K journaled in an adjacent portion of the saddle and having a dog-actuated arm $K^1$ secured to its upper end, and also having a gear-segment $K^2$ secured to its lower end;

and this shaft K is restrained against vertical movement as by means of these two parts. The angular position of this shaft is determined manually by means of a pin U², by means of which it is pivotedly connected to the hand-lever U so that any lateral oscillation of this hand-lever (irrespective of its up or down position) will be correctly interpreted by the rock-shaft K and its parts. The hand-lever U also terminates in an arc shaped lip U³, the position of which inversely corresponds with the vertical position of the hand-lever U. In other words, the lip U³ and the gear-segment K² are collectively able to analyze or reduce to its elements all of the possible positions of the hand-lever U. These two parts U³ and K² in turn mutually affect a single control-element N and the absolute positions in space of this element are in turn utilized to control the motion-reverser and the rate-controller of the table. That is to say, the element N here assumes the form of a plunger which is so mounted in the adjacent portion of the saddle or table-support that it may be shifted in an axial or up-and-down direction as well as turn about this axis. The axial shift is controlled by the lip U³ of the hand-lever and the rotations or angular positions of the plunger with relation to its axis are determined by the gear-segment K². This is done by causing the lip U³ to co-act with the circumferential spline N¹ and one or more of the teeth of the gear-segment K² similarly co-act with the axial spline-ways N² of the plunger. When the hand-lever U is down, as shown by Fig. 4, the plunger N will be elevated and a pin N³ secured thereto will then be located in the narrow portion of a slot or opening M¹ of a gear M which is rotatably carried by an adjacent part of the saddle and which meshes with the end of the long arm O¹ of a lever O which has its other end forked as indicated by O² and provided with shoes entering the circumferential groove in the clutch-element or motion reverser J. The intermeshing relation between the arm O¹ and the gear M is such that, when the pin N³ is in the narrow portion of the slot and the hand-lever is therefore in the position shown by the drawings, no appreciable lost-motion will exist and the various parts will be retained in the position shown by the spring pressure of the detent devices now to be described.

The detent means for determining and maintaining the angular position of the gear M comprises a spring pressed plunger 30 mounted to reciprocate in the opening 31 in the table-support and prevented from turning therein by means of a pin or stud 32 entering a slot or spline in the pin 30. This pin is normally urged to project farther out of its slot by means of an expansile spring 33, the tension of which may be regulated by means of a screw 34. This pin terminates in a V-shaped end 35 which, in the position of the parts shown by the drawings, is adapted to enter a V-shaped notch N⁵ in the end of a projection N⁶ extending from the cam N⁴. This cam is rigidly pinned to the trip plunger N and, when the latter is in upraised position, this cam N⁴ co-acts with the pin 30, as has been described, and the V-shaped end 35 of the pin holds the parts in the position shown, i. e., either in midway or neutral stopping position as shown by Fig. 6, or else displaced from this position, either to the right or to the left. By oscillating the hand-lever U, or by rotating the plunger N by dog-action, the parts may be brought into any one of the three available positions. For example, the V-shaped end of the spring-pressed pin will be caused to shift to one side or the other of the projection N⁶ by a part-way positive motion, with the effect that the pressure of the spring will then take on and continue the inaugurated movement and complete it as soon as any positive obstruction (such as a failure of the clutch teeth to intermesh in the first instance) is withdrawn. Preferably, the various parts are arranged somewhat as shown, so that when the hand-lever U is turned clockwise to bring the handle to the left, then will the table travel in a similar direction, i. e., to the left; or conversely, so that a swing of the handle to the right will cause the table to travel to the right. In other words, a swing of the lever U to the right will move the lever O anti-clockwise and cause the clutch J to intermesh with the gear R, or conversely a swing of the lever U to the left will cause the clutch J to engage the gear L, as shown by Fig. 2. It will be seen that the travel of the table may thus be reversed irrespective of the vertical position of the plunger N, e. g., regardless of whether the table is "feeding" or whether it is traveling at a quick-traverse rate. It may also be noted, however, that while the hand-lever may be forcibly held in position to stop the table under quick-traverse conditions, i. e., while elevated, it will remain in that position only when the control mechanism is set to cause the table to feed for the reason that a depression of the plunger N (quick-traverse position) will bring the pin N³ into a wider portion of the slot M¹ and simultaneously bring the cam N⁷ into co-action with the pin 30, and, as this cam N⁷ has no provision corresponding with the notch N⁵, but in other respects corresponds with the cam N⁴, the pin 30 will maintain it in either one of the two positions indicated by r or l on Fig. 7 without permitting an intermediate or neutral position corresponding with a stop of the table. In other words, it will only be maintained either in the position of a forward or of a rearward travel of the table. The means whereby an axial movement of the plunger N will determine the rate at which the table travels may now be detailed.

The plunger N is provided with a series of circumferential threads or spline grooves $N^8$ which mesh with a gear-segment 40 loosely mounted on the end of a shaft 41 and having its hub 42 provided with a radial slot in which loosely plays a pin 43 which is rigid with the shaft 41. This provides a certain amount of lost motion so that no parts may be broken by the positive unyielding movement imparted by the dogs to the plunger N. This gear-segment 40 is provided with two notches 44 and 45 coacting with a spring-pressed detent or pin 46, so that when the plunger N throws the gear-segment sufficiently to cause the pin 46 to override the peak of the middle projection, then will the throw be completed by an operation of the spring 47.

Referring to Fig. 4, 48 indicates a helical feather on the shaft 41 which co-acts with a corresponding groove in the clutch-shifting member 49 so that a partial rotation of the shaft 41 will effect a lateral movement of the part 49 and the clutch-sleeve 10 will be shifted either to one side or the other to connect the "quick-traverse" transmission in operative relation with the other transmitting elements or to connect the "feed" transmission therewith, as the case may be. It may here be stated that the slant or pitch of the feather 49 is in such a direction as to shift the clutch sleeve to the right when the outer end or handle of the handlever U is uplifted.

An understanding of the various characteristics of this mechanism and of its adaptability for various more or less involved automatic operations will best be obtained by an analysis of a few typical examples.

Fig. 8 depicts a comparatively simple arrangement. Assume the table to be stationary with the trip-mechanism positioned immediately to the right of the dog F+. The hand-lever U will then coincide with its median vertical plane and will be either above or below its horizontal median plane. The attendant, in desiring to start the table to the right, will now shift the hand-lever U to the right of its median vertical plane (if it does not already lie on that side), thereby bringing its projecting portion or pin 20 into the path of travel of the upper series of dogs mounted on the table, as shown by Fig. 8, i. e., the series controlling the rate of travel of the table to the right, as at a feeding rate if the hand-lever U happens to lie below its median horizontal plane, or at a quick-traverse to the right if it lies above such plane. Assuming that in order to save time, the attendant has lifted up the lever U, then the table will speed to the right until the contact-surface f of the dog F+ impacts the contact-surface f+ of the pin 20 of the trip-member N which will be in a depressed position. The effect of this impact is to elevate the tripmember N, thereby shifting the clutchmember 10 to the left, as seen by Fig. 2, so as to connect the feeding-transmission in operative or propelling relation with the table, thereby causing the table to feed to the right. The cutter is now supposed to start performing a tooling-operation on the work and this will continue while the table feeds to the right. Immediately after the cutter leaves the work, the dog Q+ impacts its contact-surface q with the contact surface q+ of the pin 20, thereby depressing the trip-member N and throwing the clutchmember 10 to the right to bring the quicktraverse transmission into operation so as to cause the rate of travel of the table quickly to increase and speed it to the right during the non-tooling interval. This may be repeated as frequently as desired by duplicating the above mentioned arrangement of dogs. In order to enable the table to stop automatically, a dog $F^1+$ will be arranged near the end of the stroke of the table so that its contact-surface $f^1$ may impact the contact-surface f+ and elevate the trip-member N. The reason for this, in this embodiment of this invention, is that the parts are so arranged that the tablepropelling mechanism may automatically be set into and maintained in a stop-position whenever the trip-member N is elevated or in its feeding-position. The table, therefore, is now feeding to the right and the dog Z+O will shortly contact the arm $K^1$ and turn the member K, as well as the handlever U, clockwise, so as to rotate the tripmember N anti-clockwise until the clutch member J of the motion reverser interrupts the transmitting capacity of the propelling mechanism; in which position it is maintained by the entry of the detent pin into notch $N^5$ of the cam $N^4$. The table is now stopped. It may, however, be started to the left at a slow or feeding rate, by simply throwing the hand-lever U to the left and without raising it; in which event, the table will slowly feed to the left throughout its full stroke and will automatically stop as soon as the dog Z—O reverses the position of the arm $K^1$ and stops the table. If, however, the attendant should also raise the hand-lever U, in addition to shifting it to the left, then the table would execute a quick-traverse to the left; in which event, the last-mentioned dog would have a different effect, inasmuch as it would now merely reverse the direction without changing the rate of the table, so that the table would, at the end of its left stroke, immediately again make a short quick-traverse to the right until the dog F+ became effective to reduce its travel to a feed. A somewhat more elaborate arrangement may now be understood.

Referring to Fig. 9 and, assuming the trip-mechanism to be positioned between the dog Z—O and the dog F+, let the attendant start the table to the right at a quick-traverse rate as before. Contact surface $f$ of the dog F+ will shortly impact the contact-surface $f+$ of the pin 20 of the trip-member N and the latter will be elevated and the table will feed to the right until the contact-surface $q$ of the dog Q+ impacts the contact-surface $q+$ of the pin 20 and depresses the trip-member, thereby causing the table to execute a quick-traverse to the right until its rate is reduced to a feed by the action of dog $F^1+$. A table will then feed to the right until the dog $Q^1+$ causes its contact-surface $q$ to impact the contact-surface $q+$ of the trip-member N and depress it; whereupon the table will again go to the right at a quick-traverse rate until the dog Z+— swings the arm $K^1$ clockwise with the effect of reversing the direction of travel of the table without changing its rate. It is noteworthy in this connection that, although dog Z+— is identical in structure and location with the dog Z+O shown on Fig. 8, nevertheless its effect is entirely different since it reverses without changing the rate, whereas the other merely stops, and the reason for this lies in the fact that its relation to the preceding dog is entirely different in the case of Fig. 9 than in the case of Fig. 8, since in Fig. 9 the preceding dog imparts a quick-traverse to the table, whereas in the case of Fig. 8 it imparts a feed to the table.

Referring again to Fig. 9 and continuing the description thereof, it may be explained that the reason the dog Z+— reverses the travel of the table, is because when it acts through the part K to turn the trip-member N, the pin $N^3$ is depressed and lies in the broader or wider part of the slot $N^1$ so that the detent-device, which acts in relation to the cam $M^7$, will act by spring-pressure to throw the clutch J entirely past its neutral or intermediate position and into interlocking position with the gear L. This connection causes the table to travel at a quick-traverse rate to the left. By placing a dog F— near the end of the stroke of the table, the end dog Z—O is enabled automatically to stop the table. That is to say, as a result of the effect of the dog Z+—, the upper pin 20 of the trip-element N has been swung to one side out of action of the upper series of dogs and the lower pin 21 has been swung into position to be impacted by any dog or dogs secured in the lower slot of the table.

Accordingly, when the pin 21 reaches the dog F—, the contact surface $f$ thereof will impact the contact-surface $f-$ of the pin 21 and raise the trip-member N, thereby causing the table to feed to the left through the distance intervening between this dog and the dog Z—O, and as soon as this last dog impacts the arm $K^1$, it will send the pin 21 out of action and will bring the pin 20 into effective position and also stop the travel of the table in very much the same way that dog Z+O in Fig. 8 stopped the table. Had the dog F— been removed, the dog at the extreme right would have had a different effect, since it would then have reversed the direction of travel of the table without stopping it. This will be understood by a description of the application of this construction for continuous milling.

Referring now to Fig. 10, and assuming that the trip mechanism is located immediately at the right of the dog Z—+ and assuming that the attendant has started the table to the right at any speed, then if that speed be a quick-traverse the dog F+ will permit it to continue as the feed. The table will then feed to the dog $Q^1+$ and then quick-traverse to the right to the dog Z+—, whereupon its direction will be reversed and it will travel at the same quick-traverse rate to the left to the first dog F— of the lower series. It will then feed to the left to the dog Q— and then quick-traverse to the dog F— and then feed to the dog Q—+ which reverses its direction without changing its rate; and the cycle will be repeated. It is noteworthy that the upper series of dogs is quite independent of the lower series so that the table may act in one direction and may operate in another way in the other direction.

The hand-operating mechanism for enabling the attendant to shift the various gears of the feed-change mechanism so that the table may be caused to feed at any one of the selectively available rates of feed, which in this instance are sixteen, may now be described. This mechanism embodies certain improvements simplifying its construction and also enhancing its facility of operation. In this embodiment, two hand-levers are utilized, the one controlling the four feed-changes constituting what may be termed the first series of multipliers; and the second lever controls what may be termed the second and also the third series of multipliers. The first lever is indicated by the character D on Figs. 11 and 12 and it comprises an arm or shank 50 that extends through an X-slot in a positioning or guard-plate 51 that projects laterally from the side of the gear-box $C^1$ which contains the feed-change mechanism as aforesaid. This brings the grip of the lever D adjacent the front longitudinal edge of the reciprocating-table where it will at all times be within the immediate grasp of the attendant. The other end of the lever is flattened to form a gear-segment 52 which is received by a radius slot 53 provided by the end-portion 54 of an elongated sleeve 55 which extends transversely to the hand-lever D and is journaled in the gear-box $C^1$ so as to permit of rotation, but not of an axial movement. The other end of this sleeve 55 provides an offset arm 56 terminating in a shoe 57 that rides in the circumferential groove 58 of the gear-unit $d^5$, so that when the sleeve 55 is partially rotated by moving the hand-lever D up or down, the gear-unit $d^5$ will be shifted laterally so as to cause one of its gears to mesh with another gear, and so that, when the hand-lever is in an intermediate position, the gear unit $d^5$ will also be in an intermediate or non-transmitting position. In the arrangement shown, when the hand-lever D is in its uppermost position, the gear-unit $d^5$ will be shifted to the left as seen by Figs. 2 and 12, with the effect that gear $d^9$ will mesh with gear $D^9$. This is the position indicated by "$d^9$ $D^9$" on Fig. 10. So also, when the hand-lever D is in its lowermost position ($d^8$ $D^8$), the gear $d^8$ will mesh with the gear $D^8$. Thus the vertical movement of the hand-lever D will determine the position of the gear-unit $D^5$. The construction is such, moreover, that the horizontal movements of the hand-lever D will also control the position of the gear-unit $D^4$. A pin 59 pivots the hand-lever to a radial extension 60 of the sleeve 55 and a rod 61 extends coaxially through the bore of the sleeve 55 and it provides a rack 62 meshing with the teeth of the gear-segment 52 so that horizontal oscillations of the hand-lever D will reciprocate the rod 61 and, by means of another rack 63, this reciprocating motion is utilized to oscillate a lever 64 which is pivoted at 65 and has an arm 66 terminating in a gear-segment meshing with the rack 63. This lever 64 also terminates in a shoe 67 riding in a circular groove 68 of the gear-unit $d^4$ so as to control the positions thereof. Hence, when the hand-lever D is swung to the right to the position $d^6$ $D^6$ indicated by Fig. 10, the gear $d^6$ will be brought into mesh with the gear $D^6$ and, conversely, when it is swung to the left into the position $d^7$ $D^7$ the gear $d^7$ will mesh with the gear $D^7$. The relation of these various gears $d^6$, $d^7$, $d^8$ and $d^9$ to the transmission system is such that but one of them may be operating at the same time, otherwise something would have to break and this circumstance is precluded by the use of the X-slot in the plate 51. In order that the hand-lever D may remain in any one of its various positions, ball-pawls 69 and 70 will preferably be provided to coöperate with appropriate recesses in the lever 64 and the sleeve 55, respectively, as will be understood by referring to Fig. 12. The other hand-lever G determines the setting or relation of the back-gears of the feed-change mechanism and it has a shank 70 passing through the square opening in the guard-plate 51 and also has a flattened end-portion 71 entering a radial-slot 72 in the exposed end-portion of a sleeve 74 which is also journaled in the gear-box $C^1$. This hand-lever is pivoted to the sleeve by means of a tangential pin 75 so that the sleeve may be rotated when the hand-lever G is lifted or depressed. The other end of this sleeve also provides a crank-arm 76 terminating in a shoe 77 riding in a slot 78 of the gear-unit $g$. When the hand-lever is lifted to the upper edge of the square-opening in the plate 51, as indicated by $D^{10}$ $g^{10}$, then will the gear $D^{10}$ transmit motion to the gear $g^{10}$ and conversely, when the hand-lever G is depressed, as indicated by $D^8$ $G^8$ on Fig. 10, then will the gear $D^8$ transmit motion to the gear $g^8$. The hand-lever G terminates in a gear-segment 79 meshing with a reciprocating-rack 80 which in turn meshes with an up-standing elongated pinion 81 that also meshes with the rack-teeth 82 of a reciprocating shift-rod 83 which carries an arm or fork 84 coöperating with the groove 85 of the gear-unit so that, when the hand-lever G is thrown to the right, as indicated by $g^{1h}$ the sleeve $g^1$ and the gear $h$ will move as a unit and, when it is thrown to the other side, the gear $G^3$ will transmit motion to the gear $h$. It is to be observed that inasmuch as it is inconsequential from the standpoint of injury whether any of the last-mentioned gears are in operation simultaneously, it is possible and even more convenient to employ a square opening instead of the more restricted form, since the attendant can throw off the lever G without anxiety as to the consequences and with greater facility.

From the foregoing, it will be observed that the hand-lever G may be moved from one position to another successively through the two rectilinear coördinates defining the point of location in space, or it may be moved diagonally from the one point to the other; it having a compound movement in the latter instance. In all cases, however, the movement of the hand-lever whether compound or simple will be resolved into its components by the mechanism connecting it with the two shifting-clutches so that the movements of the one clutch will correspond with the one coördinate of movement of the hand-lever, and the other clutch will correspond with the other coördinate. By means of this hand-lever U and the two hand-levers D and G, a complete control is exercised over the table.

The feed-change mechanism is very much simplified by avoiding the use of tumbler arrangements and by effecting all feed changes intermeshing gears laterally.

Having thus revealed this invention, we claim as new and desire to secure the following combination of elements, by Letters Patent of the United States:—

1. A mechanism of the nature disclosed combining a power-driven member; a propelled element; a first transmitting means adapted operatively to connect said member with said element and constructed to transmit motion positively at a low rate of travel, said means comprising a weak part adapted to break under undue strains and mounted to be readily replaced; a second transmitting means interchangeably available with said first transmitting means to cause said element to be propelled at a high rate of travel, said second transmitting means comprising impositive means affording a momentary lag in attaining a materially different rate of propulsion of said element under abrupt changes in the mechanical connections.

2. An automatic milling-machine organization combining a reciprocatory work-supporting table; a rotary cutter-support; table-propelling mechanism comprising two clutch-members; automatic trip-means for determining the positions of said clutch-members; a series of dogs movable with said table, the dog next to the end-dog of said series being adapted to actuate said trip-means to cause it to shift one of said clutch-members to feed said table in a given direction, and the end-dog of said series being adapted then to actuate said trip-means to shift the other of said clutch-members into a position rendering said mechanism inoperative to propel said table; and means automatically coöperating to maintain said last-mentioned clutch-member in its inoperative position when said first-mentioned clutch-member is in a table-feed position.

3. An automatic trip instrumentality of the nature disclosed combining a movable member; a plurality of dogs secured at predetermined stations to said member; trip-means normally positioned to be actuated by each of said dogs in succession during an advance movement of said member; a mechanism for propelling said member at a rate determined by said trip-means and means for enabling said trip-means to be shifted to a position beyond the influence of said dogs during a return movement of said member.

4. A mechanism of the nature disclosed comprising a power-driven member and a member ultimately deriving motion therefrom; a first means for transmitting motion therebetween; a second means for determining the rate at which said first means will cause said table to travel; a motion-reverser for determining the direction of travel of said table; and a single control element operatively connected with said motion-reverser and also with said rate-determining means whereby the one will be operated when said element is moved in a given direction, and the other will be operated when said element is moved in a direction transverse to said given direction.

5. A machine tool of the nature disclosed combining a table propelling means therefor; motion-reversing means in serial relation with said propelling means; means determining the rate of propulsion of said propelling-means; a member mounted adjacent said table and adapted to control both said motion-reversing means and also said rate-determining means; and a table-actuated dog adapted to shift said member to enable it to operate one of said means.

6. A trip instrumentality of the nature disclosed combining a table, a propelling mechanism therefor comprising a first shift-device adapted to enable said mechanism to effect either a feed or a quick-traverse of said table and also comprising a second shift-device adapted either to stop said table or to determine the direction of travel thereof; trip-means for controlling said shift-devices; a first dog carried by said table and adapted so to move said trip-means that it will actuate said first shift-device in one direction; another dog carried by said table and adapted so to move said trip-means as to cause said first shift-device to be moved in the opposite direction; and another dog on said table adapted so to move said trip-means as to actuate said second shift-device.

7. A trip mechanism of the nature disclosed combining a table providing an upper and a lower series of dogs; a trip-member providing two impact-surfaces at different elevations and extending in different angular relations with respect to the axis of said trip-member; means other than said above-specified dogs for turning said trip-member about its axis to bring the one or the other contact-surface into operative relation with the one or the other series of dogs; and mechanism for propelling the table in accordance with the position of said trip-member determined by said dogs.

8. A detent-mechanism of the nature disclosed combining a detent-means; a first cam configurated to coöperate in one manner with the detent-means; a second cam configurated in another manner to coöperate differently with the detent means; mechanism controlled in accordance with the relations of said cams to said detent-means; and means for establishing a coöperative relation between either the one cam and said detent-means, or the other cam and the detent-means.

9. A trip mechanism of the nature disclosed combining a reciprocating table; a dog movable in accordance with said table; a trip-member mounted to have a movement of rotation and also of translation; detent-means resiliently resisting one of said movements of said trip-member; a dog movable in accordance with said table adapted positively to impart the other movement to said trip member; and means for moving said trip-member against the resistance of said detent means.

10. A trip instrumentality of the nature revealed combining a movable member; a plurality of dogs rigid with said member and located at predetermined intervals thereon; a trip-means adapted in one position to be actuated successively by an advance of said dogs; mechanism for propelling said member at a rate determined by said trip-means; and means for automatically shifting the position of said trip-means to render it non-responsive to an actuation by said dogs during a return movement thereof.

11. A machine-tool organization combining a spindle; a table; a prime-mover; a speed-change mechanism between the spindle and the prime-mover; a first transmission connecting said spindle and said prime-mover through said speed-change mechanism; a feed-change mechanism adjacent the table and remote from the prime-mover; a motion-reverser between the feed-change mechanism and said table; a second transmission adapted to connect said prime-mover, said feed-change mechanism, said motion-reverser, and said table together in series in the order recited; a hand-operated member located adjacent the table; and shifting means actuated by vertical movements of said member to render operative or inoperative said feed-change mechanism, and actuated by horizontal movements of said member to determine the effect of said motion-reverser, whereby the feed of said table will be denoted by the vertical position of said hand-operated member and whereby its direction of travel will be indicated by the horizontal direction in which said member points.

12. A machine-tool of the nature disclosed combining a stationary frame-unit; a bodily-movable frame-unit; a table slidable on said bodily-movable frame-unit; a non-translating feed-screw journaled on said bodily-movable frame-unit and coöperating with a nut reciprocating with said table; a feed-change mechanism carried by said movable frame-unit near one side of said stationary frame-unit and underneath said table; operating instrumentalities extending from said feed-change mechanism and located at the front side of the longitudinal edge of said table; and automatic trip-means adjustably mounted at the longitudinal edge of said table and adapted to actuate said instrumentalities.

13. An automatic milling machine organization combining a reciprocatory work-supporting table; a rotary cutter-support; table propelling mechanism comprising two clutch-members; automatic trip-means for determining the positions of said clutch-members; a series of dogs movable with said table, the dog next to the end-dog of said series being adapted to actuate said trip-means to cause it to shift one of said clutch-members to impart a quick-traverse in a given direction to said table, and the end-dog of said series being thereby enabled to actuate said trip-means during the quick-traverse to shift the other of said clutch-members into a position causing said mechanism to propel said table in the opposite direction without changing its rate of quick-traverse.

14. A trip-instrumentality of the nature disclosed combining a reciprocating table; a trip-member pivoted about a vertical axis and having an extension terminating adjacent the longitudinal edge of said table; a dog also on said table adapted to swing said part about its vertical axis; a vertically movable part; another dog on said table adapted vertically to move said part; a table-propelling mechanism; and means governed by said trip-member for determining the operative effect on said propelling mechanism.

15. A trip-instrumentality combining a clutch-member adapted to assume different positions; a detent-means adapted to maintain said clutch-member in any one of said positions; means adapted to deprive said detent means of the capacity of maintaining said clutch-mechanism in one of said positions; and a propelling means controlled by said clutch-member.

16. A machine-tool organization combining a stationary frame-unit; a tool-supporting member mounted from the upper end thereof; a table; a bodily-movable frame-unit intervening between the table and the stationary frame-unit and providing for relative movements between said frame-unit and said table in two horizontal transverse directions; a feed-change mechanism arranged on said bodily-movable frame-unit; table-propelling means adapted to effect a relative feed between said table and said tool-supporting member in one of said directions either at a predetermined quick-traverse rate or at the rate of feed determined by said feed-change mechanism; a manually operable element arranged at the front of the machine-tool and constituting means for controlling said feed-change mechanism, whereby the rate of relative feed between the tool-supporting member and said table may be varied, and another element operable independently of said manually-operable element for causing said table-propelling means to execute a quick-traverse of said table.

17. A machine-tool of the nature disclosed combining a reciprocating member; a supporting-member therefor; a plurality of dogs secured at intervals to one of said members; trip-means mounted on the other member and adapted by the relative movement of said members to be impacted successively by a number of said dogs; means for propelling one of said members in the manner determined by said trip-means; and means for automatically shifting said trip-means into a non-impacting relation with certain of the dogs during a movement of the movable-member.

18. A machine-tool organization combining a spindle; a table; a prime-mover; a speed-change mechanism between the spindle and the prime-mover; a first transmission connecting said spindle and said prime-mover through said speed-change mechanism; a feed-change mechanism adjacent the table and remote from the prime-mover; a motion reverser between the feed-change mechanism and said table; a second transmission adapted to connect said prime-mover, said feed-change mechanism, said motion-reverser, and said table together in series in the order recited; a hand-operated member located adjacent the table and mounted to swing either horizontally or vertically; and shifting means actuated by said member when moved vertically to a predetermined position for causing the table to feed at the rate determined by said feed-change mechanism and in the direction indicated by the horizontal direction of said hand-operated member and determined by said motion-reverser.

19. A machine-tool organization combining a prime-mover; a table; a frame-unit uprising across the plane of the table; a tool-supporting member located above the table and having its weight carried by said frame-unit; a feed-change mechanism; transmitting means adapted to connect said prime-mover with said table either inclusive or exclusive of said feed-change mechanism; a hand-lever located adjacent the longitudinal edge of the table remote from the said frame-unit; and means enabling said hand-lever to determine the operative effect of said transmitting means either by including or by excluding said feed-change mechanism.

20. An automatic milling machine organization combining a reciprocatory work-supporting table; a rotary cutter support; table-propelling mechanism comprising two clutch-members; automatic trip-means for determining the positions of said clutch-members; means embodying a lost-motion detent connecting said trip-means with one of said clutch-members; a series of dogs movable with said table, the dog next to the end-dog of said series being adapted to actuate said trip-means to cause it through said lost-motion connecting means to shift impositively one of said clutch-members to cause said table to feed in a given direction; means establishing a positive connection between said trip-means and the other clutch-member when said first mentioned clutch-member occupies its last-mentioned position; the end dog of said series being thereby adapted positively to actuate said trip-means to shift positively the other of said clutch-members into a position rendering said mechanism inoperative to propel said table; and means automatically coöperating to maintain said last-mentioned clutch-member in said inoperative position.

21. An automatic trip instrumentality of the nature disclosed combining a reciprocating table; a first and a second shiftable trip-element arranged in closely-nested relation adjacent the longitudinal edge of said table; a first and a second dog mounted at the longitudinal edge of said table and each adapted to actuate the respective trip-element; mechanism for propelling said table; a first and a second clutch determining the operative effect of said propelling-mechanism; and connections between said clutches and said parts whereby the position of the one clutch will be in accordance with the position of the one part, and the position of the other clutch will be in accordance with the position of the other part.

22. A machine-tool organization combining a work-supporting member; a tool-supporting member; a pair of gears; a part adapted to be progressively moved to shift said pair of gears to enable them to yield two speeds; a gear in serial transmitting relation with said pair; a device for shifting said gear to enable the same to be driven either from its teeth or from its side to yield two different speeds; and a hand-operated element connected both with said part and with said device whereby when moved in one way it will operate said device without operating said part, and when moved in another way it will operate said part without operating said device; and transmission means operatively connecting said series of gears in serial propelling relation with one of said members.

23. A machine-tool organization combining a reciprocating table; a first series of dogs spaced at intervals along one path of travel; a second series of dogs spaced at intervals along an adjacent path of travel; trip-means adapted to be positioned to be actuated successively by dogs in the first-mentioned path of travel; a mechanism for propelling said table in the manner determined by said trip-means; and means for automatically shifting the position of said trip-means to render it responsive to the second series of dogs and non-responsive to the first series.

24. A machine-tool organization combining a prime-mover; a table; a stationary frame-unit uprising across the plane of the table; a tool-supporting member located above the table and having its weight carried by said frame-unit; a vertically-movable frame-unit having its weight carried by said stationary frame-unit; a feed-change mechanism; transmitting means adapted to connect said prime-mover with said table either exclusive of said feed-change mechanism to effect a quick-traverse of said table or inclusive thereof to feed said table; two hand-levers located adjacent the longitudinal edge of the table remote from the said stationary frame-unit; and means enabling the one hand-lever to determine the operative effect of said feed-change mechanism and enabling the other hand-lever to effect a connection or a maintained disconnection between said transmitting means and said feed-change mechanism.

25. An automatic milling-machine organization combining a reciprocatory work-supporting table; a rotary cutter-support; table-propelling mechanism comprising two clutch-members; automatic trip-means for determining the positions of said clutch-members; a series of dogs movable with said table, the dog next to the end-dog of said series being adapted to actuate said trip-means to cause it to shift one of said clutch-members to cause said table to feed in a given direction, and the end-dog of said series being thereupon adapted to actuate said trip-means to shift the other of said clutch-members into a position rendering said mechanism inoperative to propel said table; and means automatically coöperating to maintain said last-mentioned clutch-member in its inoperative position.

26. A machine-tool organization combining a tool-supporting member and a work-supporting member; a prime-mover; a feed-change mechanism; a shear-pin; an adjustable impositive means for transmitting motion frictionally; and a transmitting means adapted to establish an operative propelling relation between said prime-mover and one of said members serially through both said shear-pin and said feed-change mechanism to propel said member at a feeding rate, said means being interchangeably available to establish a propelling relation at a quick-traverse rate between said prime-mover and said member through said impositive means, exclusive of said feed-change mechanism.

27. A trip-mechanism of the nature disclosed combining a reciprocating table; a first-series of dogs adjustable thereon in one path of travel; the second-series of dogs arranged in a second path of travel and adjustable independently of the positions occupied by the members of the first-series; a trip-means adapted in one position to be actuated in succession by the dogs of the first-series and in another position to be actuated in succession by the dogs of the second-series; a mechanism for propelling a table at rates determined by said trip-means; a dog adjacent one end of said table adapted to actuate said trip-means to reverse the direction of travel of said table; and a dog at the other end of said table adapted also to reverse the direction of travel thereof.

28. A detent-mechanism of the nature disclosed combining a rotatable-member provided with two differently configurated cam-surfaces; detent means adapted to coöperate with the one or the other of said cam surfaces; a mechanism having its operative effect determined by the angular position of said member; and means for effecting a relative displacement between said detent means and said cam-surfaces, whereby said detent means may be brought into coöperative relation with either one or the other of said cam-surfaces.

29. A machine-tool organization combining a work-supporting member; a tool-supporting member; a first gear; a part adapted to be progressively moved to shift said gear to enable it to yield a series of speeds; a second gear in serial relation with said first gear; a device for shifting said second gear to enable the same to yield different speeds, and a hand-operated element connected both with said part and with said device whereby when moved in one way it will operate said device without operating said part, and when moved in another way it will operate said part without operating said device, and when moved in still another way it will simultaneously operate both said part and device; and transmission means operatively connecting said gears in serial propelling relation with one of said members.

30. A machine-tool of the nature disclosed combining a work-supporting member and a tool-supporting member; a plurality of dogs mounted at spaced intervals on one of said members; trip-means stationed adjacent the path of travel of said dogs and adapted to be shifted into position to be actuated successively by said dogs; and a dog also secured to said member and adapted at a predetermined station to shift the position of said trip-means to render it non-responsive to said dogs during a return-passage thereof.

31. A machine-tool organization combining a tool-supporting member and a work-supporting member; a prime-mover; a first train comprising transmitting elements arranged in serial relation with both a feed-change mechanism and a shear-pin; means for causing one of said members to feed at a slow rate by motion derived from said prime-mover through said train; and a quick-traverse transmission adapted to be utilized interchangeably with said train to cause said prime-mover to execute a quick-traverse of said table.

32. A machine-tool organization combining a work-supporting member; a tool-supporting member; a feed-change mechanism; a casing housing said mechanism; a single hand-operated element having one end pivotally mounted adjacent the lateral side of said casing and extending forwardly beyond the front side thereof; means connecting said element with said feed-change mechanism whereby a vertical swing of said element will render available a series of speed-changes; a device also connected with said element to be unaffected by a vertical swing thereof but operated thereby when said element is swung horizontally; and transmission means operatively connecting said feed-change mechanism in propelling relation with one of said members.

33. A trip-instrumentality of the nature disclosed combining a table providing two parallel slots at its longitudinal edge; a first-series of dogs adjustably secured in said first slot and comprising a dog formed in one way and another dog formed in another way; a second-series of dogs secured in said second slot; trip-means adapted to be positioned to be actuated by one or the other series of dogs; and means for shifting said trip-means.

34. A trip-instrumentality of the nature disclosed combining two shiftable clutch-members; an element connected with each of said clutch-members and adapted when moved in one manner to actuate the one independently of the other; detent-mechanism for resiliently maintaining said element in its different positions when moved as above stated; said element being movable in a different way to actuate the other clutch-element; and detent-means for maintaining said element in its various positions when moved as last stated.

35. A machine-tool organization combining a work-supporting member; a tool-supporting member; a guide-member providing an X-slot; mechanism for actuating one of said members; a hand-operated element pivotally supported at one end and extending forwardly through said X-slot and terminating in a hand-grasp whereby it may be oscillated either vertically or horizontally; means operatively connecting said element with said mechanism whereby a vertical swing of said element will establish one operative relation between said mechanism and the element actuated thereby, and whereby a horizontal swing of said element will establish another operative relation between said mechanism and one of said elements; and transmission means enabling said mechanism to propel one of said members.

36. A machine-tool of the nature disclosed combining a frame-unit; a casing secured to the front side thereof; a power-driven shaft extending through the rear wall of said casing and terminating in a journal mounted on the front wall thereof; a table slidable transversely on the frame-unit; a feed-screw journaled on said frame-unit and coöperating with a nut reciprocating with said table; a feed-change mechanism in said casing establishing operative connection therebetween; and hand-operating instrumentality journaled at the outer side of the front wall of said casing and located forward of the longitudinal front edge of said table.

37. A trip-mechanism of the nature revealed combining a reciprocating table; a table-support; a first part pivotally mounted on said table-support to oscillate about a vertical axis and having a portion extending toward said table; a second-part movably mounted on said table-support in underlying relation with said first-part; a dog movable with the table to swing said first-part; another dog movable with the table to actuate said second part; propelling-mechanism for the table; and means governed by said parts for determining the operative effect of said propelling-mechanism.

38. A machine-tool organization combining a work-supporting member; a tool-supporting member; a first series of gears; a part adapted to be progressively moved to shift said first series of gears to enable them to yield a series of speeds; a second series of gears in serial relation with said first series; a device for shifting said second series to enable the same to yield different speeds; a hand-operated element mounted to be swung either vertically or horizontally and connected both with said part and with said device whereby when swung vertically it will operate said device without operating said part, and when swung horizontally it will operate said part without operating said device; and transmission means operatively connecting said series of gears in serial propelling relation with one of said members.

39. A milling machine combining a table; a prime-mover; a first train comprising in serial relation a friction-clutch and quick-traverse transmitting means; a second train comprising in serial relation a shear-pin and means for transmitting motion at a slow rate corresponding to a table feed; and means for utilizing either said first train or said second train for propelling said table by power derived from said prime-mover.

40. An automatic trip-organization of the nature disclosed combining a reciprocating table; a part adapted to be translated vertically or to turn about a vertical axis; a table-propelling mechanism; means enabling said mechanism to propel said table at a fast or at a slow rate in accordance with the vertical position of said part; a dog movable with said table to shift said part in a vertical direction; and means deriving motion from said table for rotating said part.

41. A trip-instrumentality of the nature disclosed combining a reciprocating table; a series of rigid non-swiveling dogs spaced apart in the same path of movement on said table; trip-means actuated in succession by each of said dogs during their advance movement; mechanism controlled by said trip-means for propelling the table at different rates; and means enabling said series of dogs to retreat past said trip-means without contacting therewith.

42. A machine-tool organization combining a work-supporting member; a tool-supporting member; an element; a first part in axially splined relation with said element to determine its angular position; a second part in circumferentially splined relation with said element to determine its axial position; and means for determing the action of one of said members and controlled by said element.

43. A machine-tool of the nature disclosed combining a first frame-unit; a prime-mover mounted thereon; a second frame-unit slidable with relation to said first frame-unit; a power driven transmission extending from said prime-mover and terminating at one side of said second frame-unit; a table in slidable relation with said second frame-unit; a feed-screw journaled on said second frame-unit and coöperating with a nut reciprocating with said table; a feed-change box mounted at the said side of said frame-unit underneath said table and establishing connection between said transmission and feed-screw; and hand-operating instrumentalities extending from said feed-change box and located at the front side of the longitudinal edge of said table.

44. A trip-mechanism of the nature disclosed combining a reciprocating table; two movable-members arranged adjacent said table; means establishing a dependency between said members; a dog movable in accordance with said table and adapted to shift the one member; another dog movable in accordance with said table adapted to shift the position of the other member; mechanism for propelling said table; and means dependent upon said members for determining the operative effect of said mechanism.

45. A machine-tool organization combining a work-supporting member; a tool-supporting member; a mechanism affording either a feed, a quick-traverse, or a reversal of motion; a casing housing said mechanism; a single element extending into said housing; operating means provided externally thereof; interpreting mechanism connecting said element with said mechanism, whereby a rotation of said element will effect a reversal of motion, and whereby, when said element is shifted in position axially it will effect a speed-change; and transmission means operatively connecting said mechanism in propelling relation with one of said members.

46. A trip mechanism of the nature disclosed combining a reciprocating table; a first-part movably mounted adjacent said table; a second-part also mounted adjacent said table and connected to said first-part whereby said first-part may move in one way independently of said second-part, but may move in another way dependently of said second-part; a dog movable in accordance with said table to actuate said first-part independently of said second part; and another dog to actuate said second-part and cause it to move said first part; propelling mechanism for said table; and means controlling said propelling mechanism and governed in accordance with the positions of said parts.

47. A machine-tool of the nature disclosed combining a table-support mounted to be bodily moved vertically and in a horizontal plane; a feed-change box mounted at the front side thereof; an elongated table slidably mounted upon said movable table-support above said box; a non-translating feed-screw journaled on the upper side of said table-support and threaded to a nut reciprocating relatively to said box; mechanism housed by said box for propelling said table; and hand-operated means pivoted to the front side of said box near the longitudinal front edge of said table and adapted to enable the operative capacity of said mechanism to be manually determined.

48. A trip instrumentality combining a reciprocating table; a first-series of dogs occupying one path of travel; a second-series of dogs arranged in an adjacent path of travel; a trip-means actuated successively by the dogs of the first-series during the advance of said table while unaffected by the dogs of the second-series; and means for automatically shifting said trip-means at the end of the advance stroke of the table to render the first dog series ineffective during its retreat and the second dog series effective to actuate said trip-means during said retreat.

49. A trip-instrumentality of the nature disclosed combining a reciprocating table; a trip-member pivoted about a vertical axis and having an extension terminating adjacent the longitudinal edge of said table; a dog also on said table adapted to swing said part about its vertical axis; a vertically movable part; another dog on said table adapted vertically to move said part; a table-propelling mechanism; and means governed by said part and said member for determining the operative effect on said mechanism.

50. An automatic trip-organization of the nature disclosed combining a reciprocating table; a part adapted to be shifted vertically or to turn about a vertical axis; a table-propelling mechanism; means enabling said mechanism to propel said table at a fast or at a slow rate in accordance with the vertical position of said part; a dog movable with said table to shift said part in a vertical direction; and means operated by a rotation of said part to determine the direction of propulsion of said table.

51. A machine-tool organization combining a work-supporting member; a tool-supporting member; a frame; a first and a second shiftable element; a hand-operated part mounted on said frame and adapted to be oscillated in planes at right angles to one another; means operatively connecting said element with the first and the second shiftable elements whereby an oscillation of said part in one plane will effect a shift of said first element, and whereby as oscillation of said part in a transverse plane will effect a shift of said second element; and transmission means operatively determined by said elements.

52. A mechanism of the nature disclosed combining a reciprocating table providing two parallel slots at its longitudinal edge; a first-dog adjustably secured to one of said slots; a conversely-formed dog also secured in said slot; a third dog formed differently from either of said above-mentioned dogs and mounted adjacent one end of the table; propelling means for said table; and trip-means adapted when actuated by said first-dog to cause said table to be propelled at one rate, and when actuated by said second-dog to cause said table to be propelled at another rate, and adapted when actuated by said third-dog to be positioned in non-responsive relation to said first and second dogs during a return travel thereof.

53. A machine-tool organization combining a tool-supporting member and a work-supporting member; a device adapted to transmit a predetermined relatively high maximum load but to fail to transmit materially greater loads; an adjustable friction means for transmitting a predetermined minimum load and adapted to slip under a load materially less than said predetermined maximum; a feed-change mechanism; a prime-mover; and transmitting means adapted to establish an operative propelling relation between said prime-mover and one of said members through both said device and said feed-change mechanism to propel said member at a feeding rate; said means being interchangeably available to establish a propelling relation between said prime-mover and said member through said friction means and exclusive of said feed-change mechanism.

54. A milling-machine combining a table; a device adapted to transmit power only adequate to feed said table under a resistance of about five tons; means adapted to transmit power only sufficient to propel said table under a resistance of about one ton; and transmitting means interchangeably operative either through said device to feed said table or through said means to propel said table at a quick-traverse rate.

55. A mechanism of the nature disclosed combining a power-driven member; a propelled element; a first transmitting means adapted operatively to connect said member with said element and constructed to transmit motion at a low rate of travel, said means comprising a device adapted to transmit relatively heavy loads but to yield under undue strains; a second transmitting means interchangeably available with said first transmitting means to cause said element to be propelled at a high rate of travel, said second transmitting means comprising impositive means adapted to transmit relatively light loads and to yield under heavy strains so as to afford a momentary lag in attaining a materially different rate of propulsion of said element under abrupt changes in the mechanical connections.

In witness whereof, we hereunto subscribe our names as attested by the two subscribing witnesses.

ROBERT T. HAZELTON.
SOL EINSTEIN.

Witnesses:
W. R. CARY,
A. C. WAIS.